United States Patent [19]

Jensen et al.

[11] 4,397,478
[45] Aug. 9, 1983

[54] LOW-FREQUENCY-RATE SPRING SUSPENSION SYSTEM FOR A WHEELED VEHICLE

[75] Inventors: James R. Jensen, Sunol; David W. Deacon, Newark, both of Calif.

[73] Assignee: PACCAR Inc., Bellevue, Wash.

[21] Appl. No.: 350,593

[22] Filed: Apr. 3, 1981

[51] Int. Cl.³ .................................. B60G 11/26
[52] U.S. Cl. ........................ 280/711; 267/31; 280/715; 280/718
[58] Field of Search ............. 280/6 R, 6 H, 6.1, 711, 280/715, 718; 267/31, 64.28

[56] References Cited

U.S. PATENT DOCUMENTS

| | | | |
|---|---|---|---|
| 776,513 | 12/1904 | Hill | 267/46 |
| 1,036,885 | 8/1912 | Moyer | 267/46 |
| 1,442,713 | 1/1923 | DuFord | 267/17 R |
| 1,443,617 | 1/1923 | Chambers | 267/17 R |
| 1,448,224 | 3/1923 | Luce | 267/17 R |
| 1,534,424 | 4/1925 | Stark et al. | 267/17 R |
| 1,715,034 | 5/1929 | Hoover | 267/46 |
| 1,747,725 | 2/1930 | Monteith | 267/45 |
| 1,782,113 | 11/1930 | Albersheim et al. | 267/46 |
| 1,882,024 | 10/1932 | Menger | 267/17 R |
| 2,559,103 | 7/1951 | Anderson | 267/44 |
| 2,711,314 | 6/1955 | Roehrig | 267/19 R |
| 2,952,455 | 9/1960 | Neuville et al. | 267/31 X |
| 3,022,087 | 2/1962 | Black | 280/682 |
| 3,031,179 | 4/1962 | Peirce | 267/31 |
| 3,063,732 | 11/1962 | Harbers | 267/32 |
| 3,080,161 | 3/1963 | Felburn | 267/19 R |
| 3,194,580 | 7/1965 | Hamlet | 280/682 |
| 3,294,390 | 12/1966 | Warmkessel | 267/31 |
| 3,782,753 | 1/1974 | Sweet et al. | 267/31 X |
| 3,866,894 | 2/1975 | Sweet | 267/31 |
| 3,970,293 | 7/1976 | Sweet | 267/31 |
| 4,033,608 | 7/1977 | Sweet | 267/31 |
| 4,099,741 | 7/1978 | Sweet et al. | 280/712 |

FOREIGN PATENT DOCUMENTS 255729  7/1926  United Kingdom ............... 267/31

Primary Examiner—Joseph F. Peters, Jr.
Assistant Examiner—John A. Carroll
Attorney, Agent, or Firm—Owen, Wickersham & Erickson

[57] ABSTRACT

A low-frequency-rate spring suspension system for a wheeled vehicle. A metal leaf spring has one end shackled directly to a bracket on the vehicle frame and a central portion secured to an axle. The second end of the leaf spring is spaced from the frame with guide means limiting lateral movement thereof while enabling vertical and longitudinal movement thereof. An air bag of an air spring is secured to the leaf spring in between the second end and the central portion and is also secured to the frame, the air bag being offset from the axle. The height of the air bag is controlled by a valve and a lever, so that the second end does not come into contact with the frame except under extraordinary circumstances. The leaf spring positions the air bag relative to the axle and provides roll resistance, while the air spring carries load to the frame in parallel with the forward section of the leaf spring, and no vertical load is placed on the leaf spring through the rear bracket. The guide means provide lateral location to the second end of the leaf spring without transmitting vertical load.

1 Claim, 3 Drawing Figures

LOW-FREQUENCY-RATE SPRING SUSPENSION SYSTEM FOR A WHEELED VEHICLE

This invention relates to a low-frequency-rate spring suspension system for a wheeled vehicle.

BACKGROUND OF THE INVENTION

Wheeled vehicles such as trucks, which are designed to carry heavy pay loads, have been relatively hard riding due to the use by many manufactures of relatively high-frequency-rate springs. While low-frequency-rate springs have ben used, there has tended to be roll and there have been some problems in maintaining alignment.

To get a smooth ride, the present invention relies on a pneumatic spring to support the vehicle load. However, in order to locate the axle relative to the air spring and to provide roll resistance during braking, the air spring is mounted on a metal leaf spring. By having the rear end of the leaf spring retained in alignment but not shackled directly to the vehicle frame and by providing the air bag with a sensitive height control device, the invention provides the needed low-frequency spring rate through an air spring and a leaf spring in parallel, with the air spring carrying most of the load, the percentage split between the springs remaining constant through the load range. Yet the needed alignment and roll brake resistance are provided.

The closest prior art known at this time are two U.S. Pat. Nos. 3,031,179 to Peirce and 4,099,741 to Sweet et al.

The Peirce U.S. Pat. No. 3,031,179 uses an air bag for a first stage in a two-stage suspension with a metal spring for the second stage. Peirce notes that when the suspension is lightly loaded, the air spring supports the vehicle weight, but when the suspension is heavily loaded, the metal spring is in contact with the rear bracket, and the metal spring helps to carry the load. This differs from the present invention, in that in the Peirce patent the air spring is placed in series with the leaf spring when the suspension is heavily loaded.

In Sweet et al U.S. Pat. No., 4,099,741, a vertical load is placed through the shackle into the frame at the rear of the metal spring, whereas in the present invention no such load is transmitted. It should also be noted that the Sweet et al patent does not really show an air suspension, because the air bag carries only a small proportion of the load, about ⅛ of the load. The air spring is used by Sweet to give better control over the height of the frame rather than to provide air suspension. Since the Sweet air bag is offset from the axle, however, the front portion of the air spring does carry some load, but the relative stiffness of the metal spring in comparison with the low rate of the air bag means that the spring of the forward section serves more as a link than as a spring.

In the past, air bags have been used principally as a means for increasing the capacity of a suspension, or as a first stage in a two stage suspension like that of Peirce just discussed, or as a suspension spring on a variety of different air suspension systems.

OBJECTS OF THE INVENTION

An object of the present invention is to provide an air suspension system using a simple leaf spring to locate the axle and to provide roll brake resistance. The air spring used comprises an air bag combined with height control means as an essential feature.

Another object of the invention is to provide a low-frequency spring rate in a suspension system for heavy vehicles.

Another object of the invention is to locate the air spring at an offset location from the axle and without transmitting any vertical load between the frame and one end of the leaf spring.

SUMMARY OF THE INVENTION

The invention provides a low-frequency-rate spring suspension system for a wheeled vehicle.

One end of a metal leaf spring is shackled directly to a first bracket on the vehicle's frame, while a central portion of the leaf spring is secured to an axle of the vehicle. The second end of the leaf spring is not shackled directly to the frame; instead it is restrained from lateral movement by a second bracket on the vehicle frame but is not connected to that bracket.

An air bag of an air spring is secured to and between the frame and the leaf spring in between the second end and the central portion of the leaf spring. As a result, the air bag is offset from the axle. A height-control device so controls the height of the air bag that the second end of the leaf spring is ordinarily prevented from coming into contact with the second bracket.

The rear section of the leaf spring thus positions the air bag relative to the axle, while the air spring carries that portion of the load to the frame, and no vertical load is placed on the leaf spring through the second bracket. The free sliding arrangement at the second bracket provides lateral location to the second end of the leaf spring without transmitting any vertical load. The forward section of the leaf spring carries a smaller proportion of the load than the air spring while providing roll resistance.

DESCRIPTION OF PREFERRED EMBODIMENTS

Figure 1:
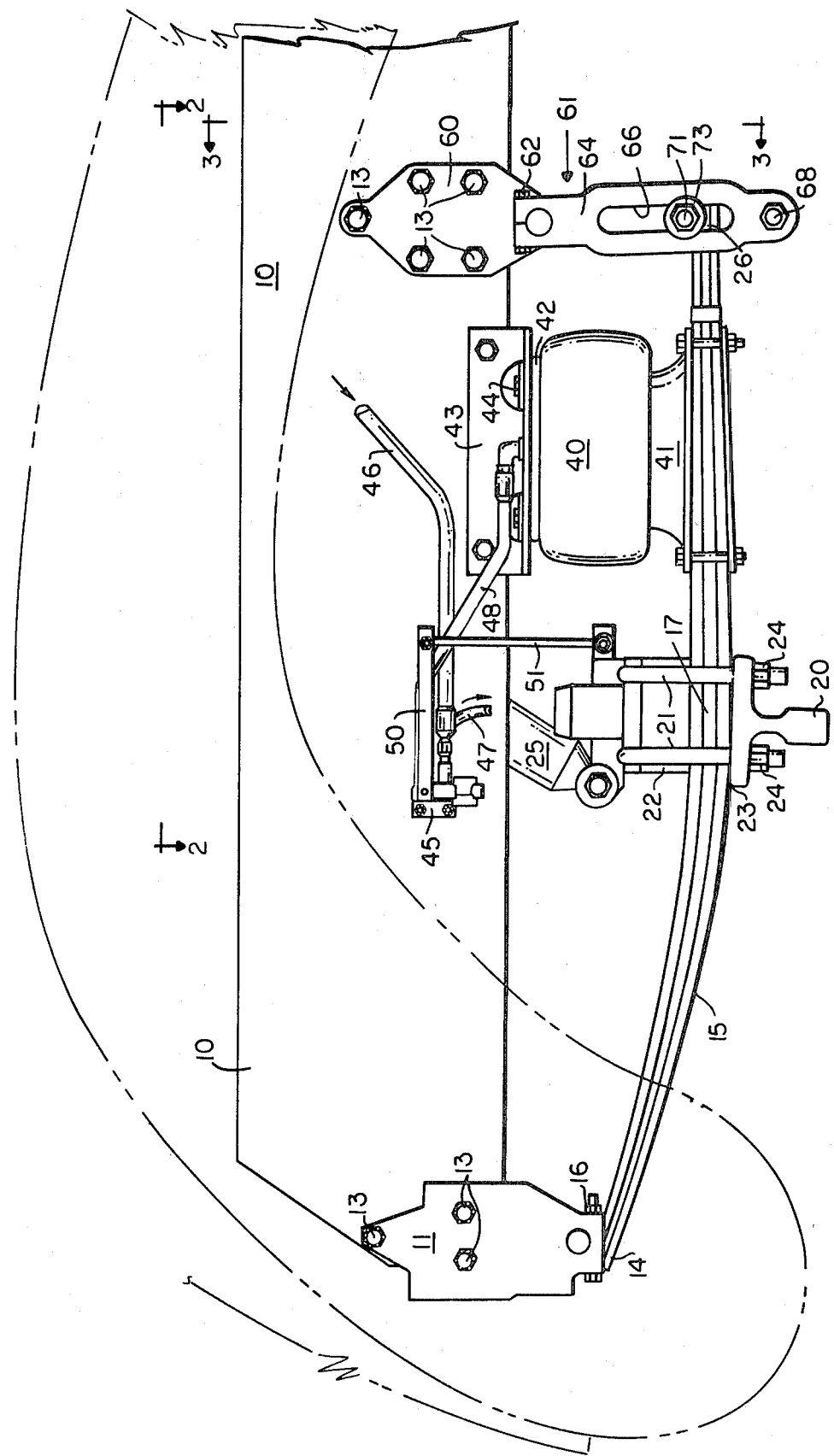
FIG. 1 is a view of a system embodying the principles of the invention.
Figure 2:
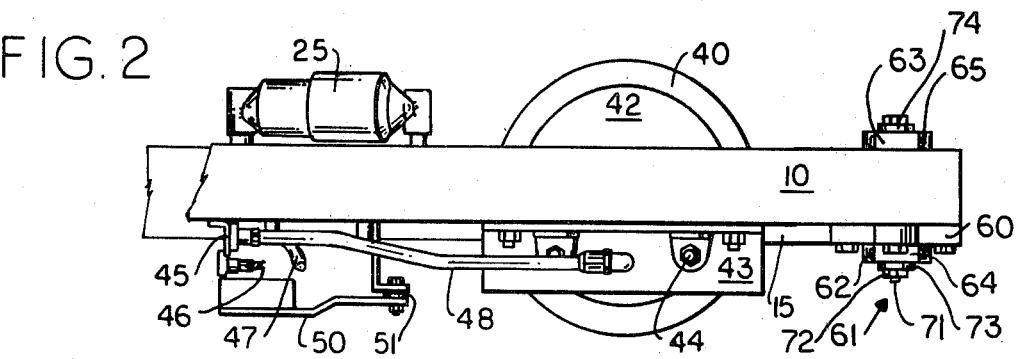
FIG. 2 is a top plan view taken along the line 2—2 in FIG. 1.
Figure 3:
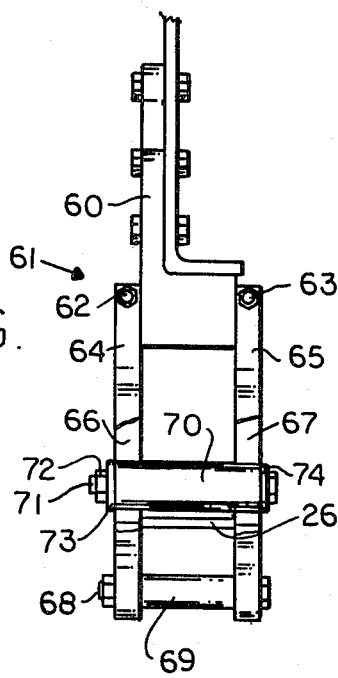
FIG. 3 is an end view looking from the line 3—3 in FIG. 1.

A suspension shown in the drawings comprises a vehicle frame 10 having a front spring bracket 11 and a rear spring bracket 61 secured thereto as by bolts 13. The device is not limited to this particular front and rear orientation, and the positions of the brackets could be reversed.

A front end 14 of a leaf spring 15 is secured by a suitable conventional shackle bolt 16 to the front bracket 11 so that there is free pivotal movement at a fixed point. The spring's central portion 17 is secured to an axle 20 by U-bolts 21, bracket 22, shim 23, and nuts 24. The shim 23 provides static adjustment for the axle 20 relative to the spring section 17, while the bracket 22 is connected at one end to one end of a suitable telescoping shock absorber 25 of a hydraulic or pneumatic type. The other end of the shock absorber 25 is secured to the vehicle frame 10.

The air spring comprises an air bag 40 having a bottom plate 41 secured by bolts 44 to the leaf spring 15 at a position offset from the axle 20 and in between the center 17 of the leaf spring 15 and the rear or second end 26 of it. Another plate 42 is secured to a bracket 43 which is secured to the frame 10.

A conventional height control valve 45 is connected by a conduit 46 to a conventional vehicle air supply (not shown), and an exhaust conduit 47 leads from it. A conduit 48 connects the valve 45 to the air bag 40. The valve 45 is actuated by a leveling valve arm 50, which is connected by a link 51 to the bracket 22. When the arm 50 is level, the air in the air bag 40 remains in status quo. When the air bag height tends to be too low (i.e. below a predetermined height), the arm 50 actuates the valve 45 to send more air to the bag 40 via conduits 46 and 48; when the air bag 40 rises too high, (i.e. above another predetermined level), the arm 50 actuates the valve 45 to bleed air from the bag 40 via the conduits 38 and 47. Thus, the air spring 40 is kept in full load supporting condition.

The section of the leaf spring 15 from the center 17 to the end 26 is not relied on to provide any spring action for the vehicle. The load is borne by the air bag 40. The arrangement at the rear of the spring 15 keeps the spring in proper alignment without transmitting any load.

In this instance, a second bracket 60 is attached to the frame 10, and a dependent bracket 61 is attached to it as by shackles 62 and 63. Two dependent side walls 64 and 65 are each provided with a vertical slot 66 or 67. At the bottom the walls 64 and 65 are joined by a bolt 68 surrounded by a cylindrical sleeve 69. Above it and above the end 26 of the spring 15 is a roller 70 which is mounted in between the walls 64 and 65 on a bolt 71; the bolt 71 is provided with a nut 72 and washers 73 and 74 so that the bolt 71 and roller 70 can slide freely up and down in the slots 66 and 67.

Lateral alignment is retained while free vertical and lengthwise movement of the spring end 26 can take place.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A low-frequency-rate spring syspension system for a wheeled vehicle having a frame with a first spring bracket, comprising:

a second spring bracket secured to said frame and having guide means depending therefrom providing a pair of laterally spaced walls an upper and lower limit means, an axle, a metal leaf spring having one end shackled directly to said first bracket, a central portion secured to said axle, and a second end extending through said guide means in between said laterally spaced walls and between said upper and lower limits, said second spring end being free from attachment to said guide means and to said second bracket so that no vertical load is transmitted therebetween while lateral alignment is maintained, said guide means comprising a pair of side walls each having a vertical elongated slot, a lower sleeve between them, said second spring end lying thereabove, and a roller having ends mounted in said vertical slots for free vertical movement therealong, said roller being located above said spring's second end, an air spring secured to and between said frame and said leaf spring in between said second end and said central portion, said air spring thereby being offset from said axle, and height-control means for controlling the height of said air spring so that said second end is ordinarily prevented from making contact with said second bracket, whereby said leaf spring positions the air spring relative to said axle and provides roll resistance, while said air spring and the leaf spring are in parallel, the air spring carrying most of the load, the percentage split of load between the two springs remaining constant.

* * * * *

UNITED STATES PATENT AND TRADEMARK OFFICE
CERTIFICATE OF CORRECTION

PATENT NO. : 4,397,478
DATED : August 9, 1983
INVENTOR(S) : James R. Jensen and David W. Deacon It is certified that error appears in the above—identified patent and that said Letters Patent are hereby corrected as shown below:

Left-hand column of first page, item [21],

"Appl. No.: 350,593" should read --Appl. No.: 250,593--

Signed and Sealed this

Twenty-fifth Day of October 1983

[SEAL]

Attest:

GERALD J. MOSSINGHOFF

Attesting Officer

Commissioner of Patents and Trademarks